(12) United States Patent
Tang (10) Patent No.: US 7,536,805 B1
(45) Date of Patent: May 26, 2009

(54) WHEELED DISTANCE MEASURING DEVICE

(76) Inventor: Yi-Wen Tang, No. 37-2, Ching-Dau 1st Street, Taichung (TW) 404

( * ) Notice: Subject to any disclaimer, the term of this patent is extended or adjusted under 35 U.S.C. 154(b) by 0 days.

(21) Appl. No.: 12/184,250

(22) Filed: Aug. 1, 2008

(51) Int. Cl.
*G01B 3/12* (2006.01)
(52) U.S. Cl. .......................................... 33/782; 33/772
(58) Field of Classification Search .................. 33/782, 33/772–781, 34–38, 39.1; 403/49, 92, 321; D10/70
See application file for complete search history.

(56) References Cited

U.S. PATENT DOCUMENTS

| | | | |
|---|---|---|---|
| 6,725,553 B2 * | 4/2004 | Airey et al. .................... 33/320 |
| 6,892,470 B2 * | 5/2005 | Olson et al. .................... 33/782 |
| 7,040,036 B1 * | 5/2006 | Wang ........................... 33/782 |
| 7,111,412 B2 * | 9/2006 | Huang .......................... 33/772 |
| 2006/0042112 A1 * | 3/2006 | Nepil ........................... 33/772 |
| 2006/0156573 A1 * | 7/2006 | Huang .......................... 33/772 |
| 2008/0148591 A1 * | 6/2008 | Kao Lin ....................... 33/772 |

* cited by examiner

*Primary Examiner*—Yaritza Guadalupe-McCall
(74) *Attorney, Agent, or Firm*—WPAT, P.C.; Anthony King (57) ABSTRACT

A wheeled distance measuring device includes a wheel unit having a wheel and a front fork with which the wheel is rotatably connected. A pole unit is connected to the front fork and a handle is connected to a top of the pole unit. A measuring unit is connected to a side of the front fork and a brake unit and an initialization unit are connected to the measuring unit. The brake unit and the initialization unit have a brake key and an initialization key received in the handle. Two respective rods are connected to the brake and initialization keys respectively and extend through the pole unit and connected to the measuring unit. By operating the brake key and the initialization key, the wheel can be braked and the measuring unit can be initialized respectively.

21 Claims, 13 Drawing Sheets

WHEELED DISTANCE MEASURING DEVICE

FIELD OF THE INVENTION

The present invention relates to a wheeled distance measuring device including a folding pole which has a handle connected thereto, a brake key and an initialization key are installed to the handle.

BACKGROUND OF THE INVENTION

A conventional distance measuring device is disclosed in U.S. Pat. No. 7,040,036 to Hui Chen Wang who is the wife of applicant and includes a wheel rotatably connected to a pole and a measuring unit is connected to a side of the wheel. The wheel includes a radius and rolls against a surface and the number of revolutions of the wheel can be counted by a counter in the measuring unit so as to obtain the distance that the wheel travels. A handle is connected to the other end of the pole and includes a brake key and an initialization key, two respective cables are connected to the brake key and the initialization key so as to brake the wheel and initialize the counter. The initialization function can also be done by pressing a key on the measuring unit.

However, the measuring unit, the pole unit and the handle are located on one side of the wheel so that the wheeled distance measuring device is not in a balance status so that when rolling the wheel to measure distance, the wheeled distance measuring device tends to move toward a side and this requires the user to correct it and cannot have a precise measurement. Besides, the brake cable and the initialization cables are too long to be broken.

The present invention intends to provide a wheeled distance measuring device wherein the pole unit can be folded to be a shorter pole and the brake key and the initialization key can be easily operated on the handle.

SUMMARY OF THE INVENTION

The present invention relates to a wheeled distance measuring device and the device comprises a wheel with a front fork connected thereto and a pole unit is connected to the front fork. The pole unit includes a first tube, a second tube, a third tube, a fourth tube and a fifth tube. A handle is connected to the fifth tube and includes a first control slot, a second control slot and a third control slot. A measuring unit is connected to a side of the front fork and includes a base, a top cover, a counter, a first arm and a second arm. The base is connected to the front fork and the top cover is mounted onto the base so as to receive a counter therein. The counter includes a rotary portion which is rotated when the wheel rolls. The first arm is located in the base and has a first control member which has an end received in the first tube. The second arm is located in the base and driven by the first arm. The second arm can initialize the counter.

A brake unit includes a first brake rod, a brake key and a second brake rod, wherein the first brake rod is received in the fourth tube and a first link is connected to a top of the first brake rod. A first contact section is connected to a lower end of the first brake rod and located in the third tube. The brake key extends through the first control slot of the handle and is pivotably engaged with the first recess of the handle. The first link is pivotably connected to a protrusion on the brake key. The second brake rod is received in the first tube and a top of the second brake rod is received in the second tube and contacts the first contact section. A brake pad is connected to a lower end of the second brake rod and located in the front fork so as to brake the wheel when the first brake rod is moved to push the second brake rod downward.

An initialization unit includes a first initialization rod, an initialization key, a pivotal member and a second initialization rod, wherein the first initialization rod is received in the fourth tube and a second link is connected to a top of the first initialization rod. A second contact section is connected to a lower end of the initialization rod and located in the third tube. The initialization key is located in the handle and is engaged with the second recess. The initialization key includes a button on a top thereof and the pivotal member has an action end which is located in contact with an underside of the button. The pivotal member includes is engaged with the third recess in the handle. The pivotal member is connected with the second link. The second initialization rod is received in the second tube and contacts the second contact section. An initialization section is connected to a lower end of the second initialization rod and in contact with the first control member of the first arm.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
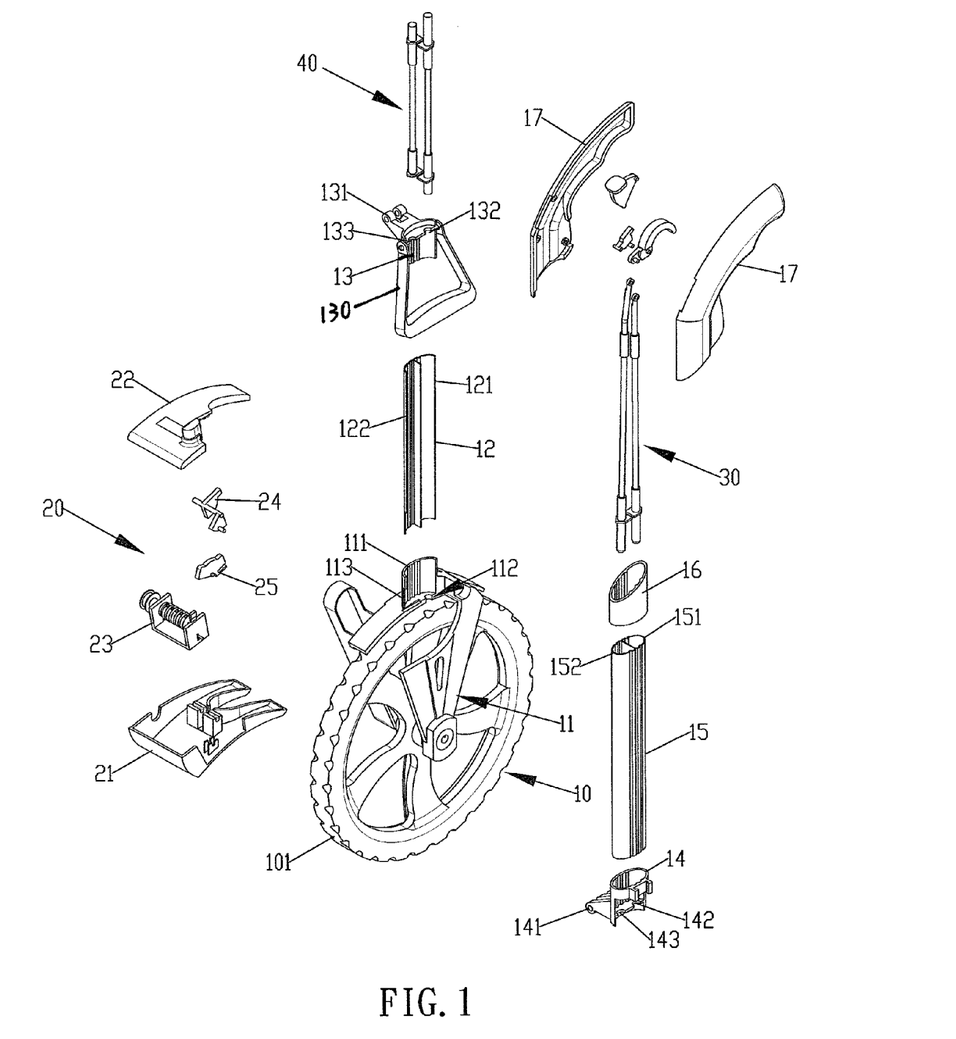
FIG. 1 is an exploded view to show the wheeled distance measuring device of the present invention.
Figure 5:
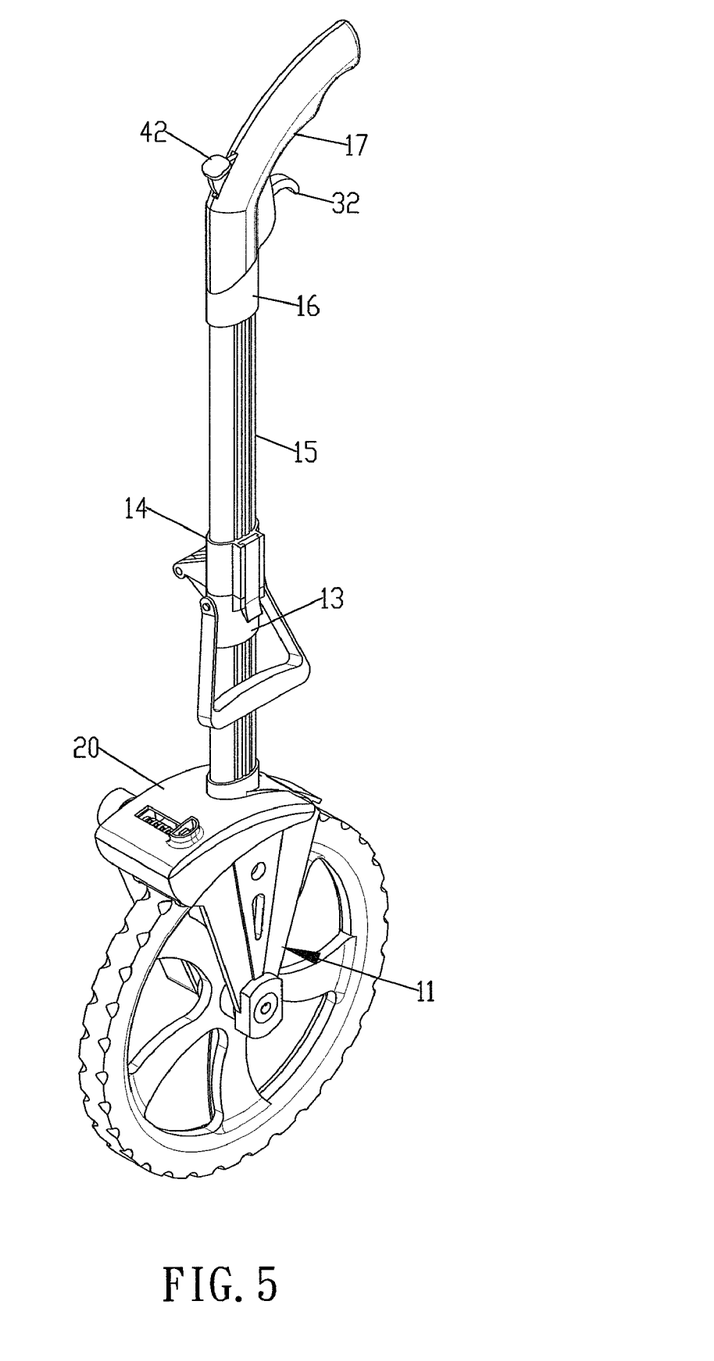
FIG. 5 is a perspective view to show the wheeled distance measuring device of the present invention.
Figure 6:
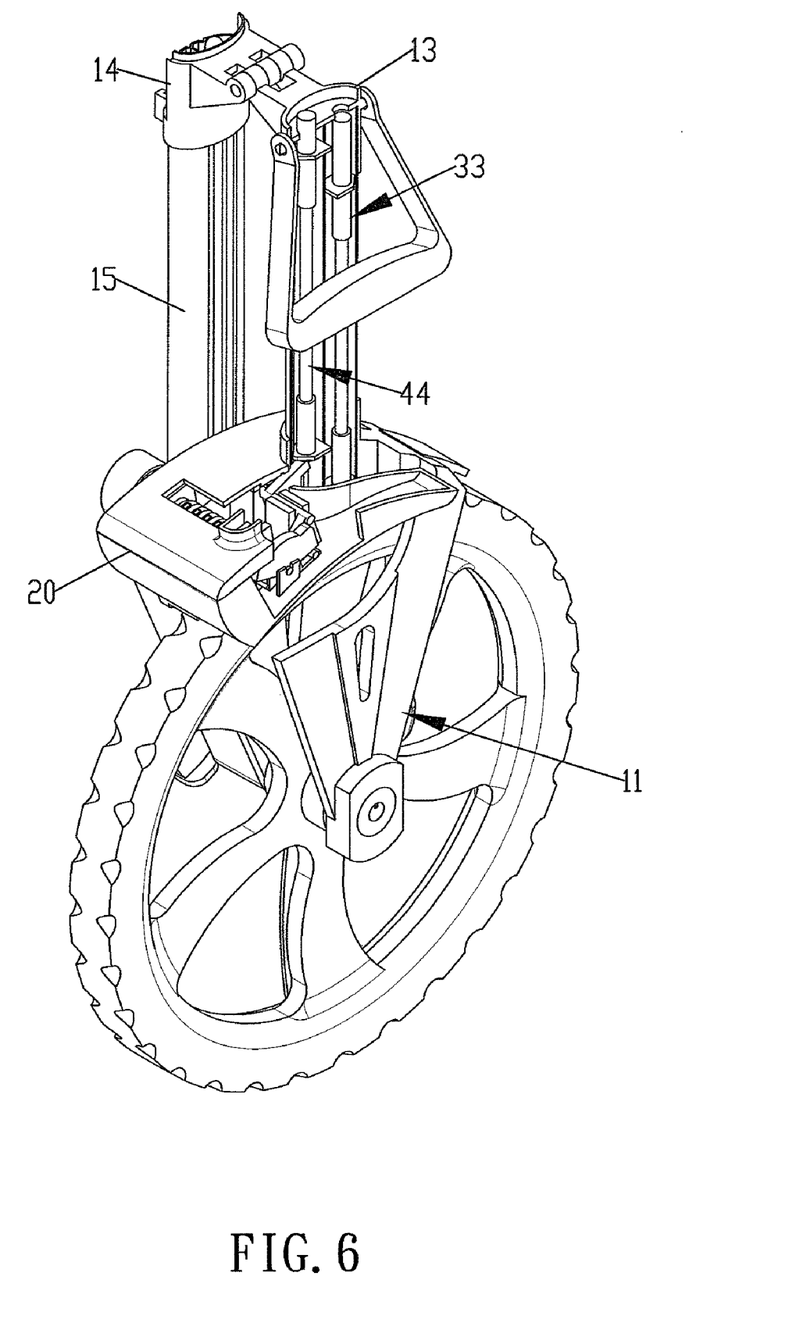
FIG. 6 shows that the pole unit of the wheeled distance measuring device of the present invention is folded.

Referring to FIGS. 1 and 5, the wheeled distance measuring device of the present invention comprises a wheel unit 10 having a wheel 101 and a front fork 11 with which the wheel 101 is rotatably connected. An insertion hole 111 is defined through a top of the front fork 11 and communicates with an opening 112 and a through hole 113 is defined in an underside of the front fork 11. The opening 112 faces the wheel 101. The pole unit is connected to the front fork 11 and includes a first tube 12 having a first end thereof securely inserted into the insertion hole 111. A first passage 121 and a second passage 122 are defined axially in the first tube 12. A separation plates separates the first passage 121 and the second passage 122. A second tube 13 has a first end connected to a second end of the first tube 12 and a first pivot 131 is located on a side of the second tube 13. The second tube 13 includes a first hole 132 and a second hole 133, wherein the first hole 132 communicates with the first passage 121 and the second hole 133 communicates with the second passage 122. A lever handle is pivotably connected to the second tube 13. A third tube 14 has a first end connected to a second end of the second tube 13 and has a second pivot 141 on a side thereof. The first and second pivots 131, 141 are pivotably connected to each other so that the second tube 13 and the third tube 14 can be pivoted to each other to shorten the length of the pole unit as shown in FIG. 6. The third tube 14 includes a third hole 142 and a fourth hole 143, wherein the third hole 142 communicates with the first hole 132 and the fourth hole 143 communicates with the second hole 133. A fourth tube 15 has a first end connected to a second end of the third tube 14. The fourth tube 15 includes a third passage 151 and a fourth passage 152 is defined axially therethrough. The third passage 151 communicates with the third hole 142 and the fourth passage 152 communicates with the fourth hole 143. The first and third passages 121, 151 communicate with each other and the second and fourth passages 122, 152 communicate with each other. A fifth tube 16 is connected between the fourth tube 15 and a handle 17.

Figure 2:
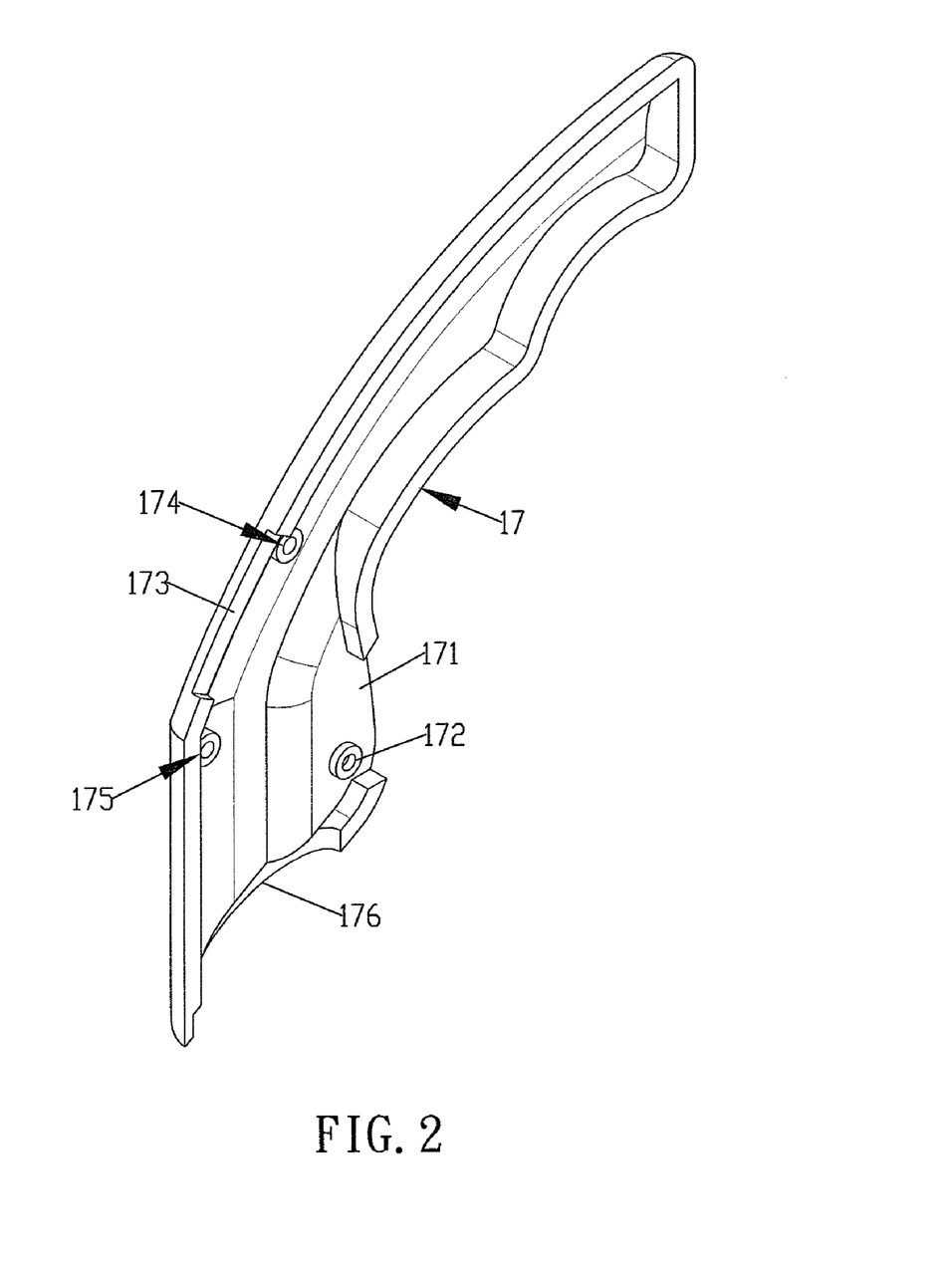
FIG. 2 shows one of two parts of the handle of the wheeled distance measuring device of the present invention.

The handle 17 is composed of two parts and each part has a first control slot 171 defined in a side thereof, a second control slot 173 defined in a top thereof and a third control slot 176 defined in an underside thereof. The first, second and third control slots 171, 173, 176 communicate with each other. The fifth tube 16 is engaged with the third control slot 176. A first recess 172 is defined in a lower portion of the first control slot 171. A second recess 174 and a third recess 175 are respectively defined in the handle 17 and located on two ends of the second control slot 173.

Figure 3:
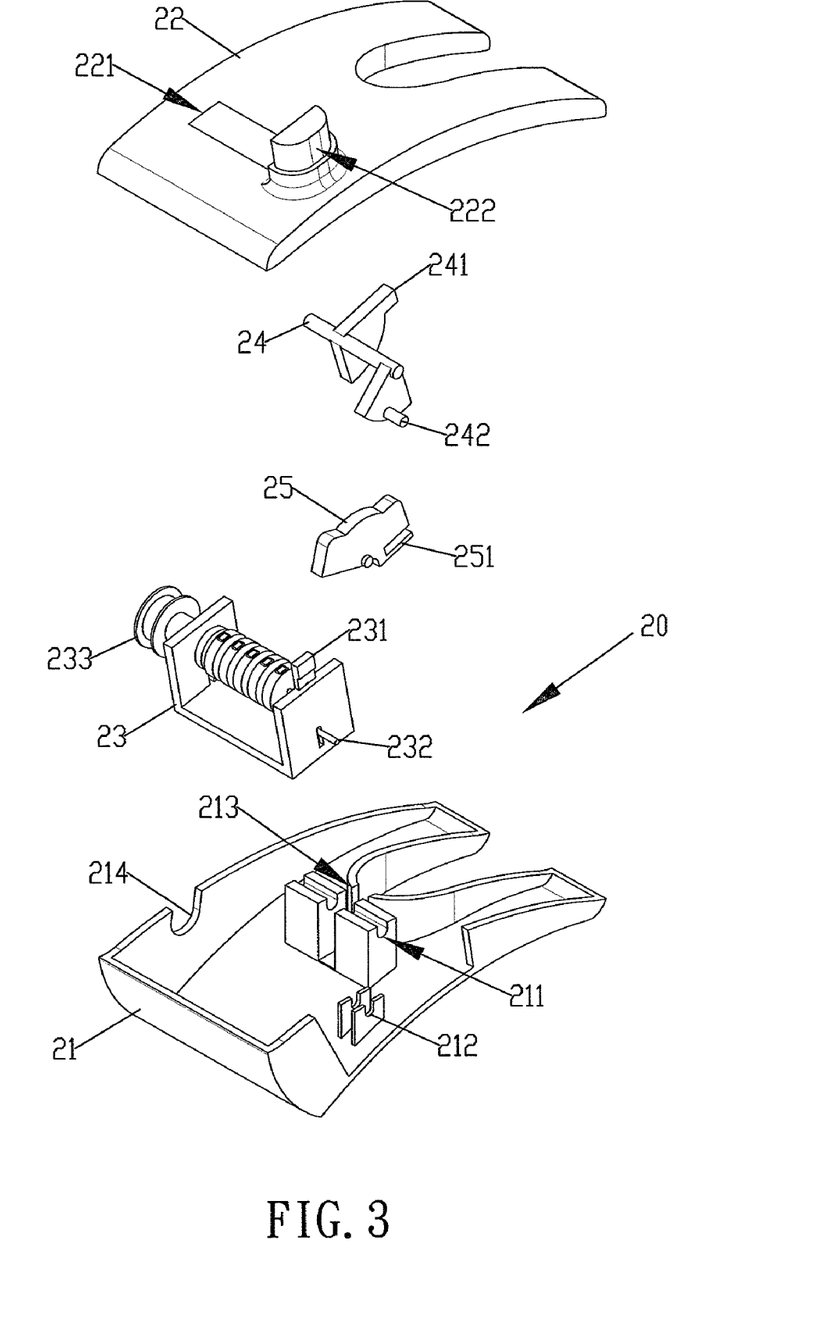
FIG. 3 is an exploded view to show the measuring unit of the wheeled distance measuring device of the present invention.
Figure 4:
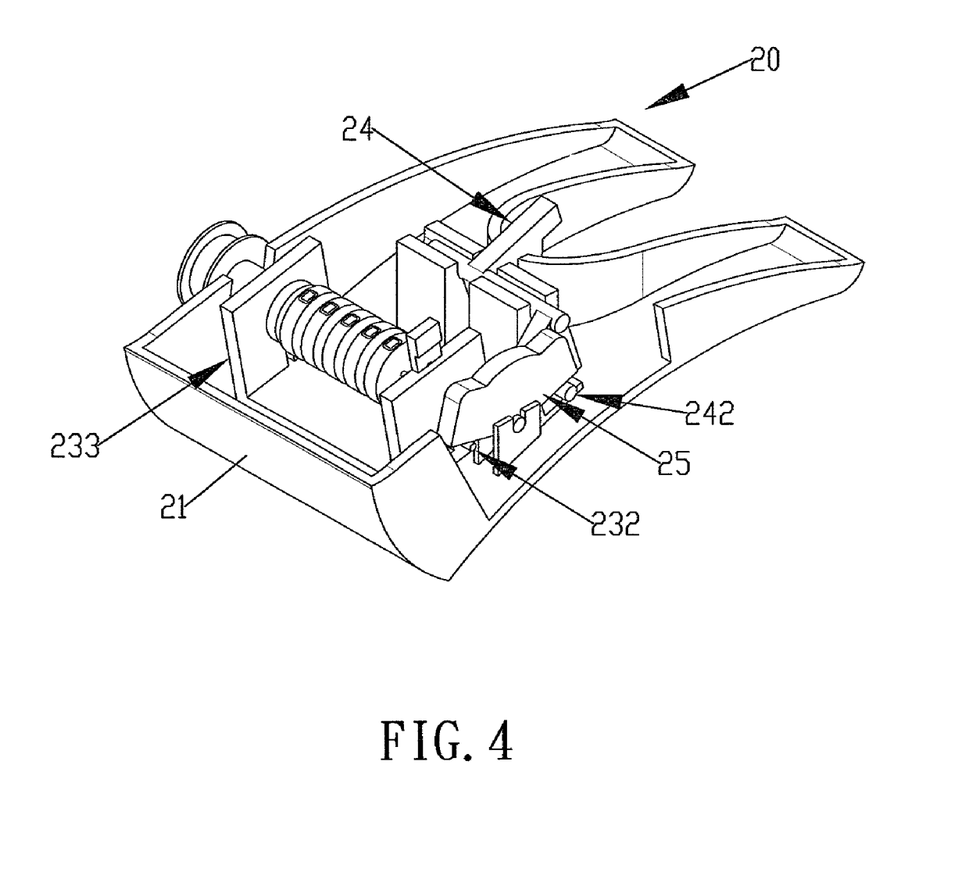
FIG. 4 is a perspective view to show the measuring unit of the present invention.

A measuring unit 20 is connected to a side of the front fork 11 and includes a base 21, a top cover 22, a counter 23, a first arm 24 and a second arm 25. The base 21 is connected to the front fork 11 and includes a control slot 213 which faces the through hole 113 of the front fork 11. The top cover 22 is mounted onto the base 21 and a counter 23 is located in the base 21. The counter 23 includes a rotary portion 233 which is rotated when the wheel 101 rolls.

The base 21 includes a first engaging notch 211 and a second engaging notch 212 which is located behind the first engaging notch 211. The control slot 213 communicates with the first engaging notch 211. A third engaging notch 214 is defined in a sidewall of the base 21 and located in opposite side to the second engaging notch 212. The second and third engaging notches 212, 214 are located on the same horizontal plane. The counter 23 is located between the second and third engaging notches 212, 214. The first arm 24 is pivotably connected to the first engaging notch 211 and the second arm 25 is pivotably connected to the second engaging notch 212. An extension rod 232 extends from a side of the counter 23 and the counter 23 is initialized when the extension rod 232 is pushed. The rotary portion 233 extends through the third engaging notch 214 of the base 21. The first arm 24 includes a driving rod 242 on an end thereof and the second arm 25 includes a slot 251 in which the driving rod 242 is engaged. An end of the second arm 25 contacts the extension rod 232 of the counter 23. The first arm 24 pivots to pivot the second arm 25 so that the second arm 25 presses the extension rod 232 to initialize the counter 23. The first arm 24 has a first control member 241 which is located in the control slot 213 and the through hole 113. The first control member 241 has an end received in the second passage 122 of the first tube 12. The second arm 25 is located in the base 21 and driven by the first arm 24 so that the counter 23 can be initialized by operation of the second arm 25.

The top cover 22 further includes a transparent window 221 which is located above the second and third engaging notches 212, 214 so as to see the counter 23. An initialization button 222 is located beside the window 221 and the counter 23 includes a push piece 231 which is connected to the initialization button 222 and the extension rod 232 is located beneath the push piece 231. The counter 23 is initialized when initialization button 222 is pressed.

Figures 7, 8:
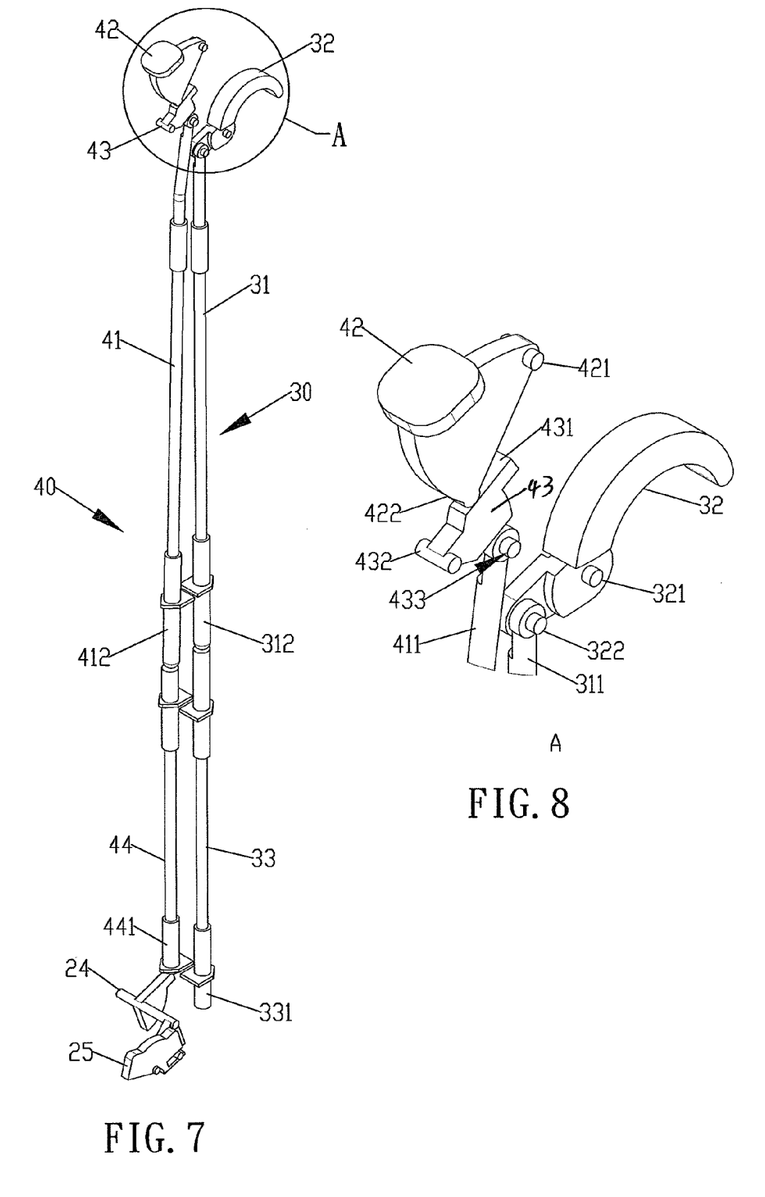
FIG. 7 shows the brake unit and the initialization unit of the wheeled distance measuring device of the present invention is folded.
FIG. 8 shows the brake key and the initialization key of the brake unit and the initialization unit of the wheeled distance measuring device of the present invention.
Figure 9:
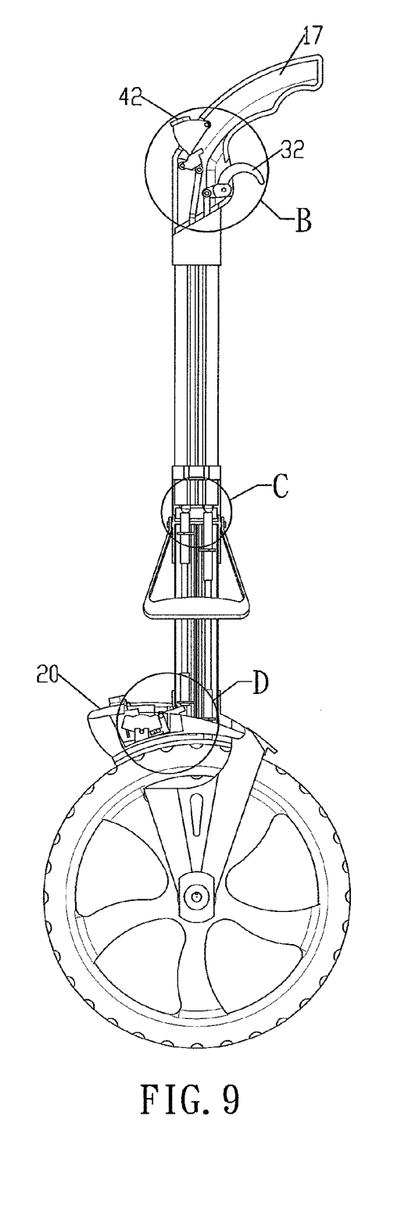
FIG. 9 is a side view, partially removed of the wheeled distance measuring device of the present invention.
Figures 10, 11:
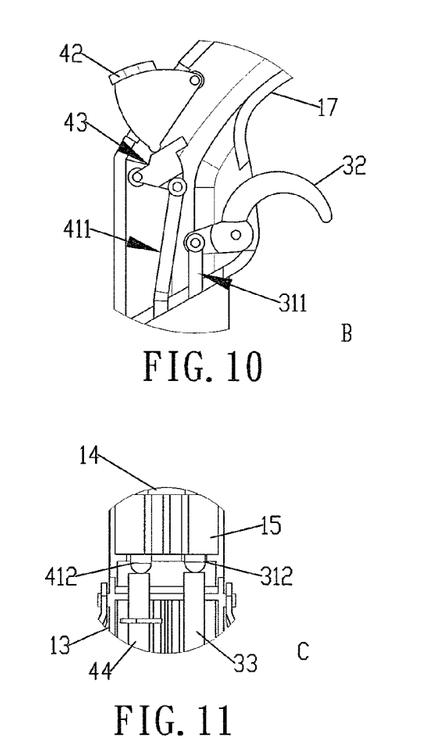
FIG. 10 is an enlarged view to show the portion circled by circle "B" in FIG. 9.
FIG. 11 is an enlarged view to show the portion circled by circle "C" in FIG. 9.
Figure 12:
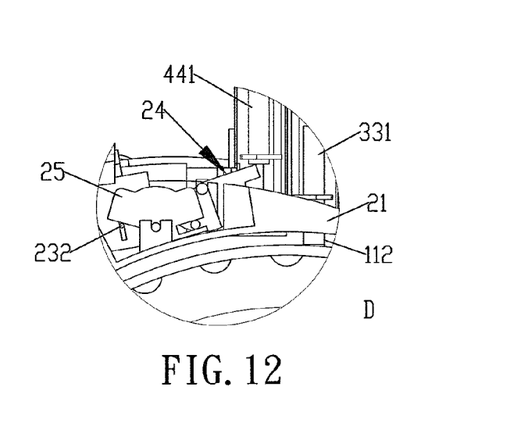
FIG. 12 is an enlarged view to show the portion circled by circle "D" in FIG. 9.

Further referring to FIGS. 7 and 8, a brake unit 30 includes a first brake rod 31, a brake key 32 and a second brake rod 33. The first brake rod 31 is received in the third passage 151 of the fourth tube 15 and a first link 311 is connected to a top of the first brake rod 31. The link 311 of the brake unit 30 is located in the handle 17. A first contact section 312 is connected to a lower end of the first brake rod 31 and located in the third hole 142 of the third tube 14. The brake key 32 extends through the first control slot 171 of the handle 17 and has a third pivot 321 which is pivotably engaged with the first recess 172 of the handle 17. A fourth pivot 322 is located at a distance from the third pivot 321 and the first link 311 is pivotably connected to the protrusion 322. The second brake rod 33 is received in the first passage 121 of the first tube 12 and a top of the second brake rod 33 is received in the first hole 132 of the second tube 13 and contacts the first contact section 312. A brake pad 331 is connected to a lower end of the second brake rod 33 and located in the opening 112 of the front fork 11 so as to brake the wheel 101 when the first brake rod 31 is moved to push the second brake rod 33 downward.

An initialization unit 40 includes a first initialization rod 41, an initialization key 42, a pivotal member 43 and a second initialization rod 44. The first initialization rod 41 is received in the fourth passage 152 of the fourth tube 15 and a second link 411 is connected to a top of the first initialization rod 41. The second link 411 of the first initialization rod 41 is received in the handle 17. A second contact section 412 is connected to a lower end of the initialization rod 41 and located in the fourth hole 143 of the third tube 14. The initialization key 42 is located in the handle 17 and has a fifth pivot 421 which is engaged with the second recess 174. The initialization key 42 is received in the second control slot 173 of the handle 17 and includes a button 422 on a top thereof. The pivotal member 43 has an action end 431 which is located in contact with an underside of the button 422. The pivotal member 43 includes a sixth pivot 432 which is engaged with the third recess 175 in the handle 17. The pivotal member 43 includes a seventh pivot 433 which is pivotably connected with the second link 411. The second initialization rod 44 is received in the second hole 133 of the second tube 13 and contacts the second contact section 412. An initialization section 441 is connected to a lower end of the second initialization rod 44 and in contact with the first control member 241 of the first arm 24.

As shown in FIGS. 9 to 12, when the brake key 32 is not yet pressed, the first brake rod 31 has not yet pushed the second brake rod 33 so that the brake pad 331 is not in contact with the wheel 101. When the initialization key 42 is not yet pressed, the first initialization rod 41 does not push the second initialization rod 44, so that the initialization section 441 does not press the first arm 24.

Figure 13:
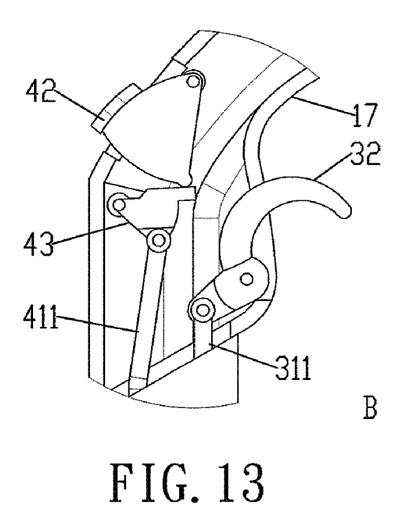
FIG. 13 is an enlarged view to show that the parts in FIG. 10 are activated.
Figure 14:
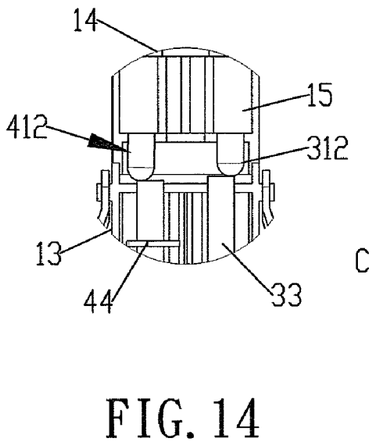
FIG. 14 is an enlarged view to show that the parts in FIG. 11 are activated.
Figure 15:
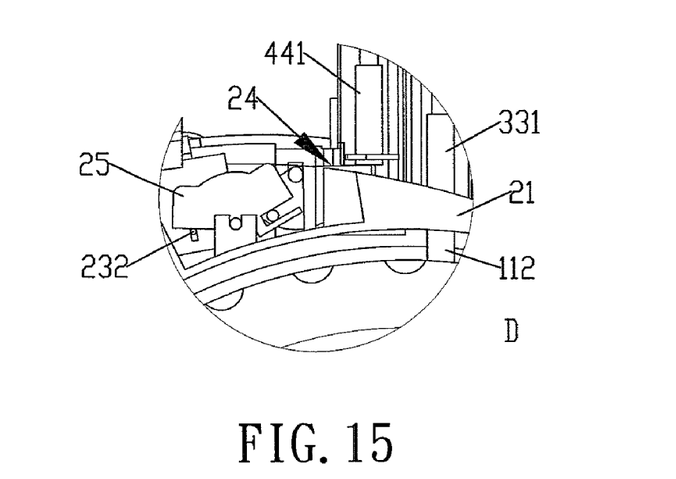
FIG. 15 is an enlarged view to show that the parts in FIG. 12 are activated.
Figure 16:
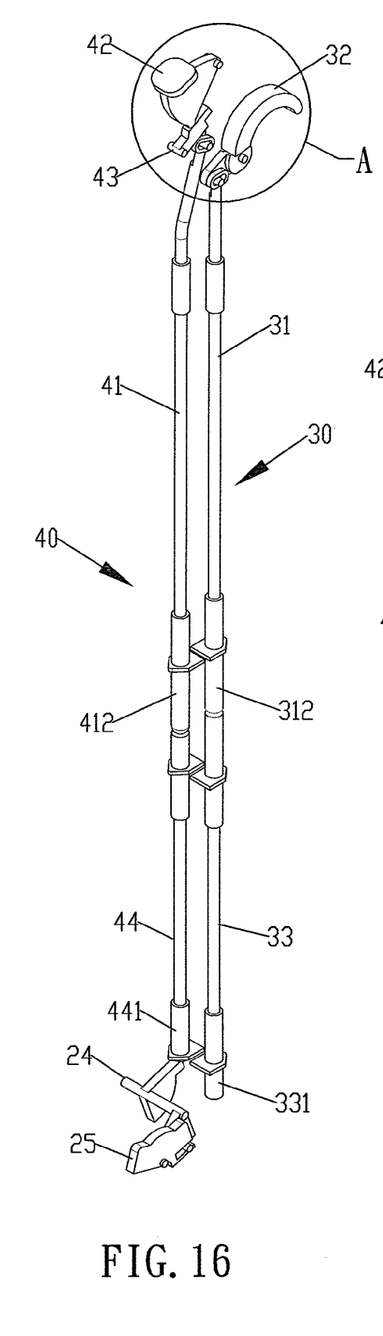
FIG. 16 shows the second embodiment of the brake unit and the initialization unit of the wheeled distance measuring device of the present invention is folded.
Figure 17:
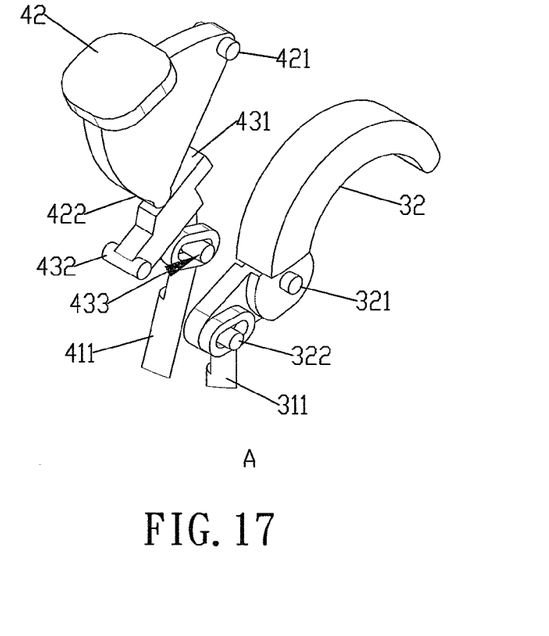
FIG. 17 shows the brake key and the initialization key of the brake unit and the initialization unit of the wheeled distance measuring device in FIG. 16.
Figure 18:
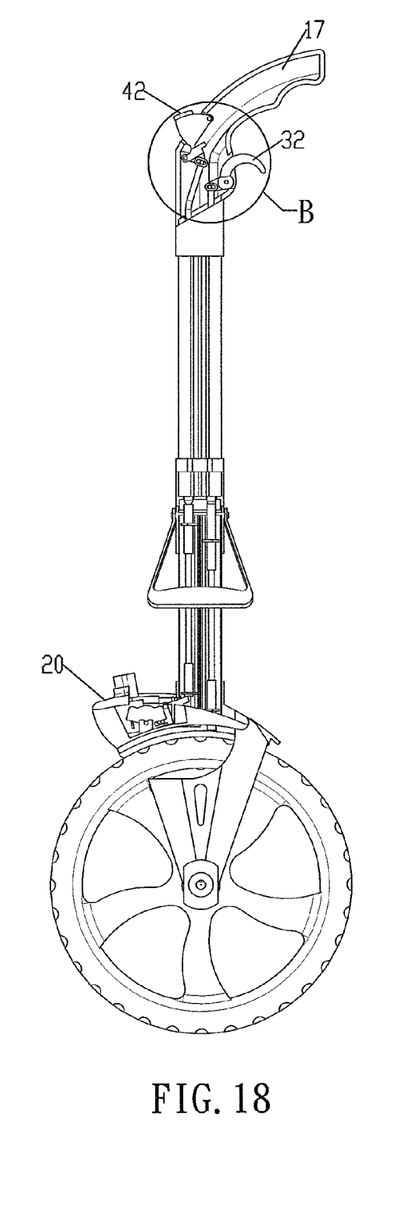
FIG. 18 is a side view, partially removed of the wheeled distance measuring device of the present invention in FIG. 16.
Figure 19:
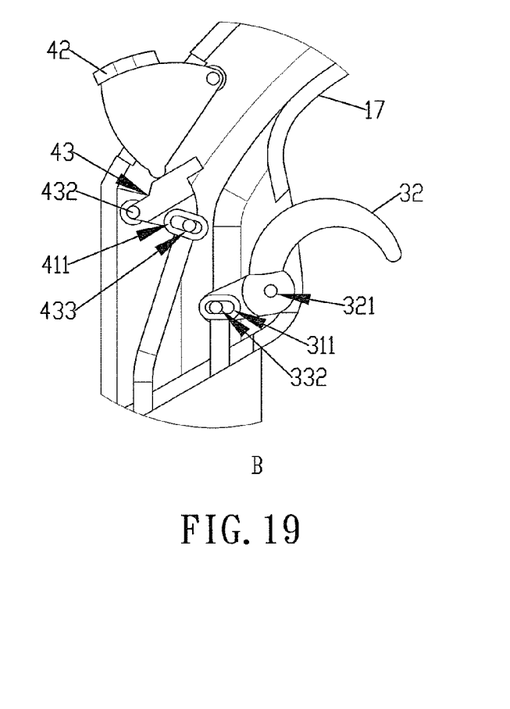
FIG. 19 is an enlarged view to show the portion circled by circle "B" in FIG. 18.
Figure 20:
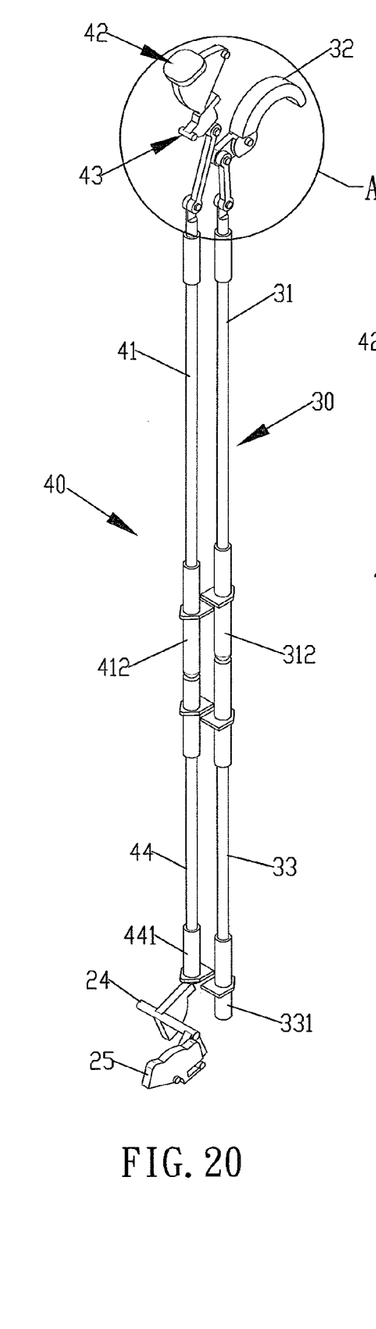
FIG. 20 shows the third embodiment of the brake unit and the initialization unit of the wheeled distance measuring device of the present invention is folded.
Figure 21:
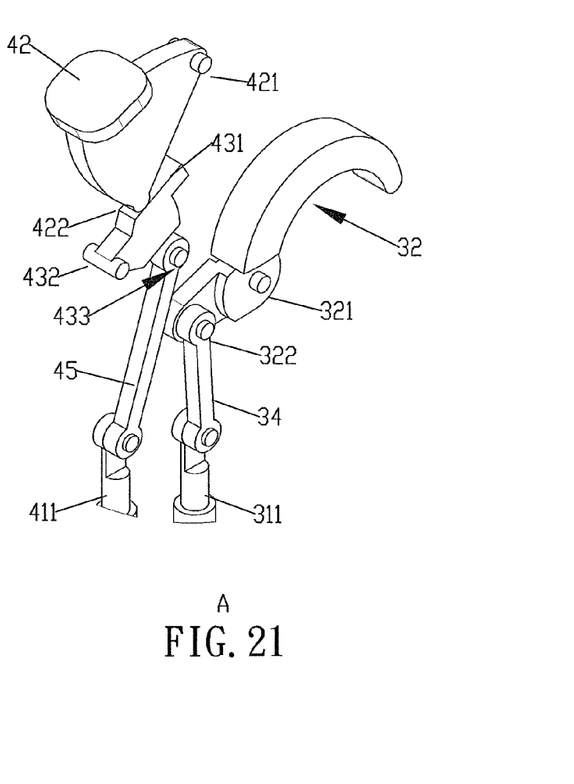
FIG. 21 is an enlarged view of the portion circled by circle "A" in FIG. 20.
Figure 22:
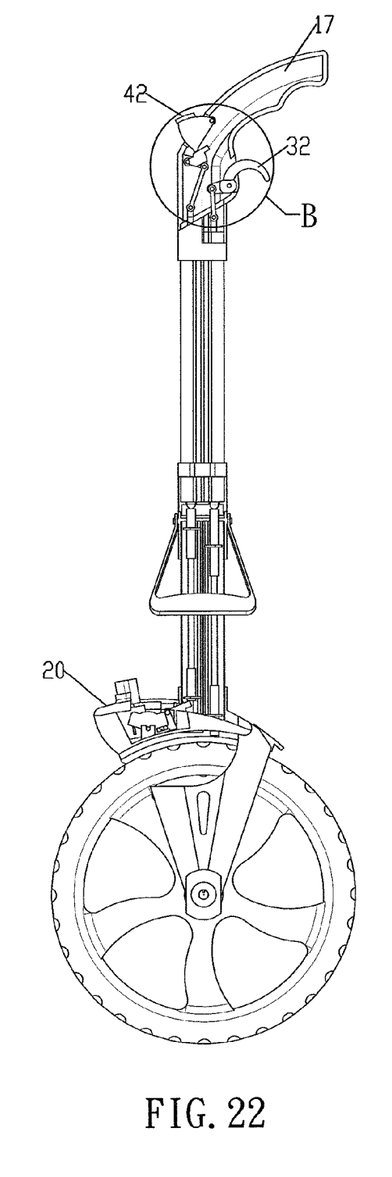
FIG. 22 is a side view, partially removed of the wheeled distance measuring device of the present invention in FIG. 20.
Figure 23:
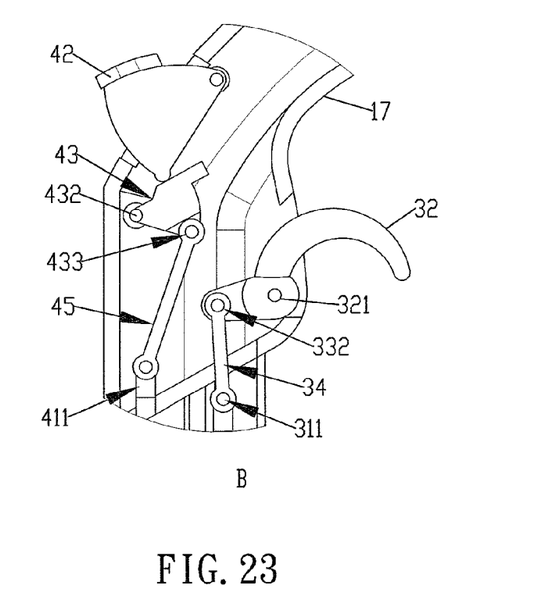
FIG. 23 is an enlarged view to show the portion circled by circle "B" in FIG. 22.

As shown in FIGS. 13 to 15, when the brake key 32 is pressed, the brake key 32 pushes the first brake rod 31 downward which moves the second brake rod 33 so that the brake pad 331 contact against the wheel 101 which is stopped. When the initialization key 42 is pressed, the pivotal member 43 is pivoted and the first initialization rod 41 is lowered which pushes the second initialization rod 44 so that the initialization section 441 pivots the first arm 24 which pivots the second arm 25, and the extension rod 232 is pressed to initialize the counter 23.

FIGS. 16 to 19 show a second embodiment of the brake unit 30 and the initialization unit 40, wherein the fourth engaging notch 322 of the brake key 32 is pivotably engaged with an elongate slot in the first link 311, and the seventh pivot 433 of the pivotal member 43 is pivotably engaged with an elongate slot in the second link 411.

FIGS. 20 to 23 show a third embodiment of the brake unit 30 and the initialization unit 40, wherein the brake unit 30 includes a third contact section 34 which is pivotably connected between the fourth engaging notch 322 and the first link 311. The initialization unit 30 includes a fourth contact section 45 which is pivotably connected between the seventh engaging notch 433 and the second link 411.

The wheeled distance measuring device of the present invention includes an advantage which is a balance of weight on two sides of the wheel unit 10. The brake and initialization function can be directly controlled from the handle 17. The brake unit 30 and the initialization unit 40 are operated by rods which are reliable and durable.

While we have shown and described the embodiment in accordance with the present invention, it should be clear to those skilled in the art that further embodiments may be made without departing from the scope of the present invention.

What is claimed is:

1. A wheeled distance measuring device comprising:

a wheel unit (10) having a wheel (101) and a front fork (11) with which the wheel (101) is rotatably connected, an insertion hole (111) defined through a top of the front fork (11) and communicating with an opening (112) and a through hole (113) defined in an underside of the front fork (11), the opening (112) facing the wheel (101);

a first tube (12) having a first end thereof securely inserted into the insertion hole (111), a first passage (121) and a second passage (122) defined axially in the first tube (12), a second tube (13) having a first end connected to a second end of the first tube (12) and a first pivot (131) located on a side of the second tube (13), the second tube (13) including a first hole (132) and a second hole (133), the first hole (132) communicating with the first passage (121), the second hole (133) communicating with the second passage (122), a third tube (14) having a first end connected to a second end of the second tube (13) and having a second pivot (141) on a side thereof, the first and second pivots (131, 141) being pivotably connected to each other, the third tube (14) including a third hole (142) and a fourth hole (143), the third hole (142) communicating with the first hole (132) and the fourth hole (143) communicating with the second hole (133), a fourth tube (15) having a first end connected to a second end of the third tube (14), the fourth tube (15) including a third passage (151) and a fourth passage (152) defined axially therethrough, the third passage (151) communicating with the third hole (142) and the fourth passage (152) communicating with the fourth hole (143), the first and third passages (121, 151) communicating with each other and the second and fourth passages (122, 152) communicating with each other, a fifth tube (16) connected between the fourth tube (15) and a handle (17), the handle (17) having a first control slot (171) defined in a side thereof, a second control slot (173) defined in a top thereof and a third control slot (176) defined in an underside thereof, the first, second and third control slots (171, 173, 176) communicating with each other, the fifth tube (16) engaged with the third control slot (176), a first recess (172) defined in a lower portion of the first control slot (171), a second recess (174) and a third recess (175) respectively defined in the handle (17) and located on two ends of the second control slot (173);

a measuring unit (20) including a base (21), a top cover (22), a counter (23), a first arm (24) and a second arm (25), the base (21) connected to the front fork (11) and including a control slot (213) which faces the through hole (113) of the front fork (11), the top cover (22) mounted onto the base (21) and a counter (23) located in the base (21), the counter (23) including a rotary portion (233) which is rotated when the wheel (101) rolls, the first arm (24) located in the base (21) and having a first control member (241) which is located in the control slot (213) and the through hole (113), the first control member (241) having an end received in the second passage (122) of the first tube (12), the second arm (25) located in the base (21) and driven by the first arm (24), the second arm (25) initializing the counter (23);

a brake unit (30) having a first brake rod (31), a brake key (32) and a second brake rod (33), the first brake rod (31) received in the third passage (151) of the fourth tube (15) and a first link (311) connected to a top of the first brake rod (31), a first contact section (312) connected to a lower end of the first brake rod (31) and located in the third hole (142) of the third tube (14), the brake key (32) extending through the first control slot (171) of the handle (17) and having a third pivot (321) which is pivotably engaged with the first recess (172) of the handle (17), a fourth pivot (322) located at a distance from the third pivot (321) and the first link (311) pivotably connected to the protrusion (322), the second brake rod (33) received in the first passage (121) of the first tube (12) and a top of the second brake rod (33) received in the first hole (132) of the second tube (13) and contacting the first contact section (312), a brake pad (331)

connected to a lower end of the second brake rod (33) and located in the opening (112) of the front fork (11) so as to brake the wheel (101) when the first brake rod (31) is moved to push the second brake rod (33) downward, and an initialization unit (40) including a first initialization rod (41), an initialization key (42), a pivotal member (43) and a second initialization rod (44), the first initialization rod (41) received in the fourth passage (152) of the fourth tube (15) and a second link (411) connected to a top of the first initialization rod (41), a second contact section (412) connected to a lower end of the initialization rod (41), the second contact section (412) located in the fourth hole (143) of the third tube (14), the initialization key (42) located in the handle (17) and having a fifth pivot (421) which is engaged with the second recess (174), the initialization key (42) including a button (422) on a top thereof and the pivotal member (43) having an action end (431) which is located in contact with an underside of the button (422), the pivotal member (43) including a sixth pivot (432) which is engaged with the third recess (175) in the handle (17), the pivotal member (43) including a seventh pivot (433) which is connected with the second link (411), the second initialization rod (44) received in the second hole (133) of the second tube (13) and contacting the second contact section (412), an initialization section (441) connected to a lower end of the second initialization rod (44) and being in contact with the first control member (241) of the first arm (24).

2. The device as claimed in claim 1, wherein a separation plates separates the first passage (121) and the second passage (122).

3. The device as claimed in claim 1, wherein a lever handle is pivotably connected to the second tube (13).

4. The device as claimed in claim 1, wherein the third passage (151) of the fourth tube (15) communicates with the first passage (121) of the first tube (12), the fourth passage (152) communicates with the second passage (122).

5. The device as claimed in claim 1, wherein the handle (17) is composed of two parts.

6. The device as claimed in claim 1, wherein the base (21) includes a first engaging notch (211) and a second engaging notch (212) which is located behind the first engaging notch (211), the control slot (213) communicates with the first engaging notch (211), a third engaging notch (214) is defined in a sidewall of the base (21) and located in opposite side to the second engaging notch (212), the second and third engaging notches (212, 214) are located on the same horizontal plane, the counter (23) is located between the second and third engaging notches (212, 214), the first arm (24) is pivotably connected to the first engaging notch (211) and the second arm (25) is pivotably connected to the second engaging notch (212).

7. The device as claimed in claim 6, wherein an extension rod (232) extends from a side of the counter (23) and the counter (23) is initialized when the extension rod (232) is pushed.

8. The device as claimed in claim 7, wherein the first arm (24) includes a driving rod (242) on an end thereof and the second arm (25) includes a slot (251) in which the driving rod (242) is engaged, an end of the second arm (25) contacts the extension rod (232) of the counter (23), the first arm (24) pivots to pivot the second arm (25) so that the second arm (25) presses the extension rod (232) to initialize the counter (23).

9. The device as claimed in claim 7, wherein the counter (23) includes a push piece (231) which is connected to the initialization button (222) and the extension rod (232) is located beneath the push piece (231).

10. The device as claimed in claim 6, wherein the rotary portion (233) extends through the third engaging notch (214) of the base (21).

11. The device as claimed in claim 6, wherein the top cover (22) includes a transparent window (221) which is located above the second and third engaging notches (212, 214) so as to see the counter (23), an initialization button (222) is located beside the window (221) and initializes the counter (23) when initialization button (222) is pressed.

12. The device as claimed in claim 1, wherein the link (311) of the brake unit (30) is located in the handle (17).

13. The device as claimed in claim 1, wherein the brake key (32) is located in the first control slot (171) of the handle (17).

14. The device as claimed in claim 1, wherein the fourth pivot (322) of the brake key (32) is pivotably connected to the first link (311) of the first brake rod (31).

15. The device as claimed in claim 1, wherein the second link (411) of the first initialization rod (41) is received in the handle (17).

16. The device as claimed in claim 1, wherein the initialization key (42) is received in the second control slot (173) of the handle (17).

17. The device as claimed in claim 1, wherein the seventh pivot (433) of the pivotal member (43) is pivotably connected with the second link (411) of the first initialization rod (41).

18. The device as claimed in claim 1, wherein the fourth engaging notch (322) of the brake key (32) is pivotably engaged with an elongate slot in the first link (311).

19. The device as claimed in claim 1, wherein the seventh pivot (433) of the pivotal member (43) is pivotably engaged with an elongate slot in the second link (411).

20. The device as claimed in claim 1, wherein the brake unit (30) includes a third contact section (34) which is pivotably connected between the fourth engaging notch (322) and the first link (311).

21. The device as claimed in claim 1, wherein the initialization unit (30) includes a fourth contact section (45) which is pivotably connected between the seventh engaging notch (433) and the second link (411).

* * * * *